United States Patent
Lyyra

(10) Patent No.: US 10,739,581 B2
(45) Date of Patent: Aug. 11, 2020

(54) PINHOLE CAMERA WITH AN INTEGRATED LENS CLEANING CHAMBER, AND A LENS CLEANING SYSTEM FOR A PINHOLE CAMERA

(71) Applicant: Procemex Oy, Jyväskylä (FI)

(72) Inventor: Jorma Lyyra, Kuopio (FI)

(73) Assignee: Procemex Oy, Jyväskylä (FI)

( * ) Notice: Subject to any disclaimer, the term of this patent is extended or adjusted under 35 U.S.C. 154(b) by 283 days.

(21) Appl. No.: 15/948,536

(22) Filed: Apr. 9, 2018

(65) Prior Publication Data

US 2018/0299667 A1    Oct. 18, 2018

(30) Foreign Application Priority Data

Apr. 12, 2017    (FI) ...................................... 20175339

(51) Int. Cl.
*G02B 27/00* (2006.01)
*B08B 3/02* (2006.01)
(Continued)

(52) U.S. Cl.
CPC ............ *G02B 27/0006* (2013.01); *B08B 3/02* (2013.01); *B08B 5/02* (2013.01); *G03B 17/08* (2013.01);
(Continued)

(58) Field of Classification Search
CPC .. G02B 27/0006; H04N 5/2254; G03B 17/08; G03B 19/16; G03B 17/55; B08B 3/02;
(Continued)

(56) References Cited

U.S. PATENT DOCUMENTS 3,453,049 A    7/1969    Wager
3,737,663 A    6/1973    Quittner
(Continued)

FOREIGN PATENT DOCUMENTS

CA    2059054 A1    7/1993
EP    2796616 A1    10/2014
(Continued)

OTHER PUBLICATIONS

Search report of EP18397512.7 dated Jun. 22, 2018 by European Patent Office.

*Primary Examiner* — Kimberly N. Kakalec
(74) *Attorney, Agent, or Firm* — Berggren LLP

(57) ABSTRACT

The invention relates to a pinhole camera comprising a cleaning chamber for maintaining the quality of images taken by the pinhole camera, the pinhole camera comprising a lens having a rectangular cross-section, a cover glass in front of the lens, for preventing the access of washing liquid, air and impurities into the camera. Furthermore, the camera comprises a cleaning chamber formed between the cover glass and the wall comprising the pinhole of the pinhole camera by means of a flange, the flange being provided with an opening from which compressed air and washing liquid can be supplied by a tube into the cleaning chamber, for cleaning the cleaning chamber. The compressed air and the washing liquid are configured to exit the cleaning chamber via the pinhole of the pinhole camera. Furthermore, the invention relates to a web monitoring beam and a system for cleaning the pinhole camera.

8 Claims, 2 Drawing Sheets

(51) Int. Cl.
*B08B 5/02* (2006.01)
*G03B 19/16* (2006.01)
*G03B 17/55* (2006.01)
*H04N 5/225* (2006.01)
*G03B 17/08* (2006.01)
*G01N 21/89* (2006.01)

(52) U.S. Cl.
CPC ............ *G03B 17/55* (2013.01); *G03B 19/16* (2013.01); *H04N 5/2254* (2013.01); *G01N 21/8901* (2013.01); *G01N 21/8914* (2013.01); *G01N 2021/8917* (2013.01)

(58) Field of Classification Search
CPC ...... B08B 5/02; B08B 17/06; G01N 21/8914; G01N 21/8901; G01N 2021/8917; G01N 21/15
See application file for complete search history.

(56) References Cited

U.S. PATENT DOCUMENTS

| | | |
|---|---|---|
| 4,240,691 A | 12/1980 | Holmqvist |
| 4,969,035 A | 11/1990 | Dawson |
| 5,777,668 A | 7/1998 | Amano |
| 6,198,537 B1 | 3/2001 | Bokelman |
| 2005/0168736 A1 | 8/2005 | Slater |
| 2007/0206942 A1* | 9/2007 | Gyde Heaven ........ G01N 21/15 396/287 |
| 2009/0250533 A1* | 10/2009 | Akiyama ................ B60S 1/381 239/284.1 |
| 2013/0247827 A1 | 9/2013 | Andersson |
| 2014/0320634 A1* | 10/2014 | Lyyra .................... G03B 17/02 348/88 |
| 2015/0296108 A1 | 10/2015 | Hayakawa |
| 2016/0272165 A1 | 9/2016 | Hsiao |

FOREIGN PATENT DOCUMENTS

| | | |
|---|---|---|
| JP | 2001-171491 A | 6/2001 |
| JP | 2003156450 A | 5/2003 |
| JP | 2004109828 A | 4/2004 |

* cited by examiner

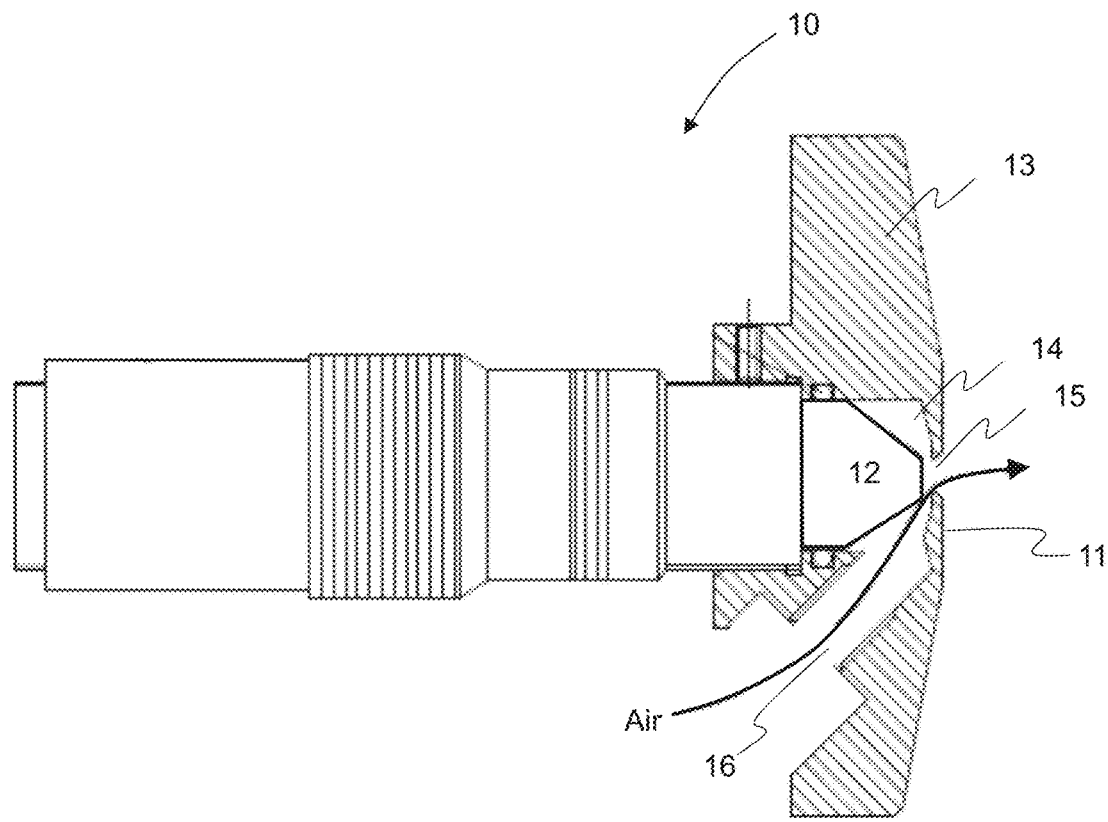
FIG. 1 - PRIOR ART
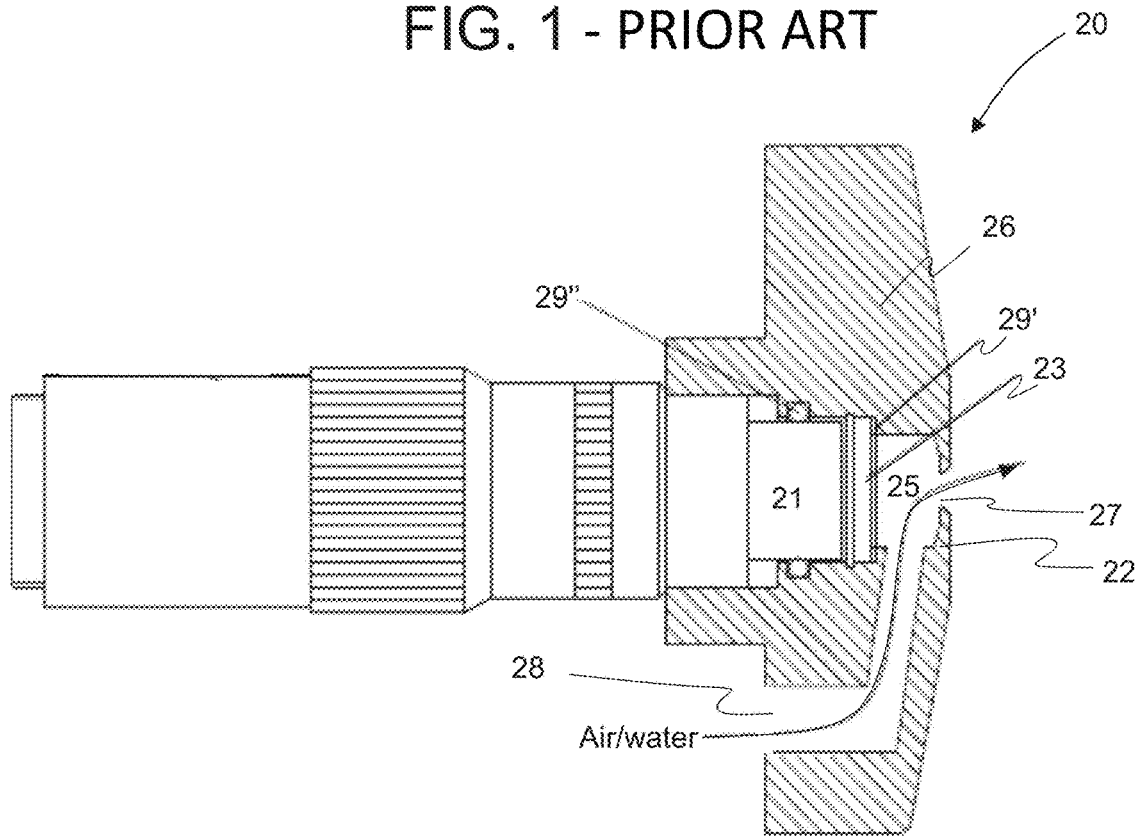
FIG. 2

PINHOLE CAMERA WITH AN INTEGRATED LENS CLEANING CHAMBER, AND A LENS CLEANING SYSTEM FOR A PINHOLE CAMERA

PRIORITY

This application claims priority of Finnish national application number 20175339 filed on Apr. 12, 2017, the contents of which is incorporated herein by reference.

FIELD OF THE INVENTION

The present invention relates to a system for cleaning pinhole cameras in web monitoring beams used for web monitoring and/or fault detection of web-like products, for example in paper machines or paper board machines, as well as a pinhole camera comprising an integrated device for cleaning lenses and for maintaining them clean.

BACKGROUND OF THE INVENTION

Paper machines and paper board machines are used for forming web-like material, such as paper or paper board, running continuously through the machine. The web running in paper machines has to be monitored in order to detect possible faults in the paper or paper board web and to achieve good quality in the final product. Normally, web break cameras of web monitoring systems are installed in various beams or beam structures extending below, above, or by the side of the web. From above the web, the cameras monitor the quality of the web, for example, via openings or windows in the beams or beam structures. However, the quality of images produced by a camera belonging to a web monitoring camera system placed in a beam structure may be affected by splashes in paper and paper board machines, blurring the monitoring windows or camera lenses. The soiling makes it difficult to detect faults in the web. However, the quality of the web has to be controllable in order to meet the strict quality specifications set by customers.

At present, it is necessary to perform manual washing of the lenses, or the structures protecting the lenses, for example transparent covers, of the cameras in beams and beam systems when they become soiled, so that the soiling would not impair the quality of the image material recorded by the cameras. Alternatively, a washing liquid spray may be provided in front of the lenses, on the outside. In addition to or instead of the washing, the lens protecting structures can be cleaned by blowing compressed air or compressed gas. Upon blowing, the compressed air/gas is directed to pass in front of the lens protecting structures so that the dirt is removed by the stream of compressed air/gas along the lens or the structures, making imaging of better quality possible. Alternatively, the air can be blown into the camera where it flows along the side of the camera, cooling down the camera, and further past the lens, making it clean, and exiting the camera through the pinhole.

BRIEF SUMMARY OF THE INVENTION

It is an aim of the present invention to provide a solution to the drawbacks of the cameras in the above-mentioned web monitoring systems, and to present a novel lens cleaning chamber for pinhole cameras used in web monitoring beams, a cleaning system for cameras, and a web monitoring beam comprising pinhole cameras and a cleaning system according to the invention. A particular aim of the invention is to maintain the quality of the images taken by the pinhole camera. The pinhole cameras according to the invention, the cleaning system, as well as the web monitoring beam comprising web hole cameras according to the invention and the cleaning system, are characterized in what will be presented in the independent claims, and the dependent claims relate to preferred embodiments of the invention.

The invention is based on the fact that the pinhole camera comprises an integrated lens cleaning chamber. The pinhole camera according to the invention comprises a lens with a level surface, and a cover glass or another transparent protective surface substantially parallel with the wall comprising the hole is arranged in front of the lens. A cleaning chamber is provided between this cover glass and the so-called pinhole wall comprising the pinhole. Compressed air and washing liquid are blown non-simultaneously into this cleaning chamber so that the dirt accumulated in the cleaning chamber in front of the frontmost lens of the camera is removed from the cleaning chamber via the pinhole, either in the compressed air or in the washing liquid. The washing liquid may be, for example, water or any liquid suitable for cleaning. The presence of the cover glass makes it possible to use the washing liquid, because the cover glass prevents the washing liquid from entering the lens and/or other parts of the camera which might be damaged by the washing liquid. The placement of the cover glass in the camera is enabled by the level shape of the surface of the frontmost lens, that is, the lens shape with a substantially rectangular cross-section instead of the shape of a truncated cone, i.e. a front lens having the cross-sectional shape of a triangle with a truncated tip, which has been used before.

The invention relates to a pinhole camera comprising a cleaning chamber for maintaining the good quality of images taken by the pinhole camera. The pinhole camera comprises a lens with a rectangular cross-section; a cover glass fixed in front of the lens in an air and liquid proof way to prevent the entry of air and impurities in the lens and the camera; a cylindrical cleaning chamber formed between the cover glass and the pinhole wall of the pinhole camera by means of a flange; and the flange being provided with an inlet via which compressed air and washing liquid can be supplied via a tube into the cleaning chamber, for cleaning the cleaning chamber. The compressed air and washing liquid are configured to exit the cleaning chamber via the pinhole of the pinhole camera.

In a preferred embodiment, the cleaning chamber is cylindrical and is formed between the cover glass and the pinhole wall of the pinhole camera so that the first end of the cleaning chamber is fastened to the cover glass and the second end of the cleaning chamber is fastened to the pinhole wall in an air and liquid proof manner. In a preferred embodiment, the compressed air and the washing liquid are supplied to the cleaning chamber from a compressed air container and from a washing liquid container, respectively and non-simultaneously. In a preferred embodiment, the pinhole camera is suitable for use in a web monitoring beam.

Furthermore, the invention relates to a web monitoring beam comprising several pinhole cameras arranged in the web monitoring beam, a compressed air container, a washing liquid container, and a branched tube. The pinhole cameras are of a type that comprises a cleaning chamber for maintaining the quality of the images taken by the pinhole camera. Furthermore, the pinhole camera comprises a lens having a rectangular cross section; a cover glass fixed in front of the lens in an air and liquid proof manner, for preventing the entry of washing liquid, air and impurities into the lens and the camera; a cylindrical cleaning chamber formed between the cover glass and the pinhole wall of the pinhole camera by means of a flange; and the flange being provided with an inlet via which compressed air and washing liquid can be supplied via a tube into the cleaning chamber, for cleaning the cleaning chamber. The compressed air and washing liquid are configured to exit the cleaning chamber via the pinhole of the pinhole camera. The first end of the tube is connected to the compressed air container and the washing liquid container, and the second end is connected to the inlets in the flanges of the cameras, for supplying air and washing liquid from the compressed air container and the washing liquid container into the cleaning chambers of the pinhole cameras.

In a preferred embodiment, the pinhole cameras placed in the web monitoring beam are configured to be cooled by supplying motor cooling air into the web monitoring beam from the end of the web monitoring beam. In a preferred embodiment, the motor cooling air supplied to the beam for the purpose of cooling is supplied into the beam by, for example, a tube.

The invention further relates to a system for cleaning the pinhole camera, comprising a compressed air container, a washing liquid container, a tube, and at least one pinhole camera. Said at least one pinhole camera comprises a lens with a rectangular cross section; a cover glass fixed in front of the lens in an air and liquid proof manner for preventing the entry of washing liquid, air and impurities into the lens and the camera; a cylindrical cleaning chamber formed between the cover glass and the pinhole wall of the pinhole camera by means of a flange; and the flange being provided with an inlet via which compressed air and washing liquid can be supplied by a tube into the cleaning chamber, for cleaning the cleaning chamber, and which cleaning chamber the compressed air and the washing liquid are configured to exit via the pinhole of the pinhole camera. The tube is connected to the compressed air container and the washing liquid container, as well as at least one pinhole camera so that compressed air and washing liquid can be supplied non-simultaneously to the cleaning chamber of at least one pinhole camera.

DESCRIPTION OF THE DRAWINGS

In the following, the present invention will be described in more detail with reference to the appended drawings, in which FIG. 1 shows a pinhole camera of prior art, comprising a cleaning chamber;

FIG. 2 shows a cleaning chamber of a pinhole camera according to a preferred embodiment of the invention;

DETAILED DESCRIPTION OF THE INVENTION

Figure 3:
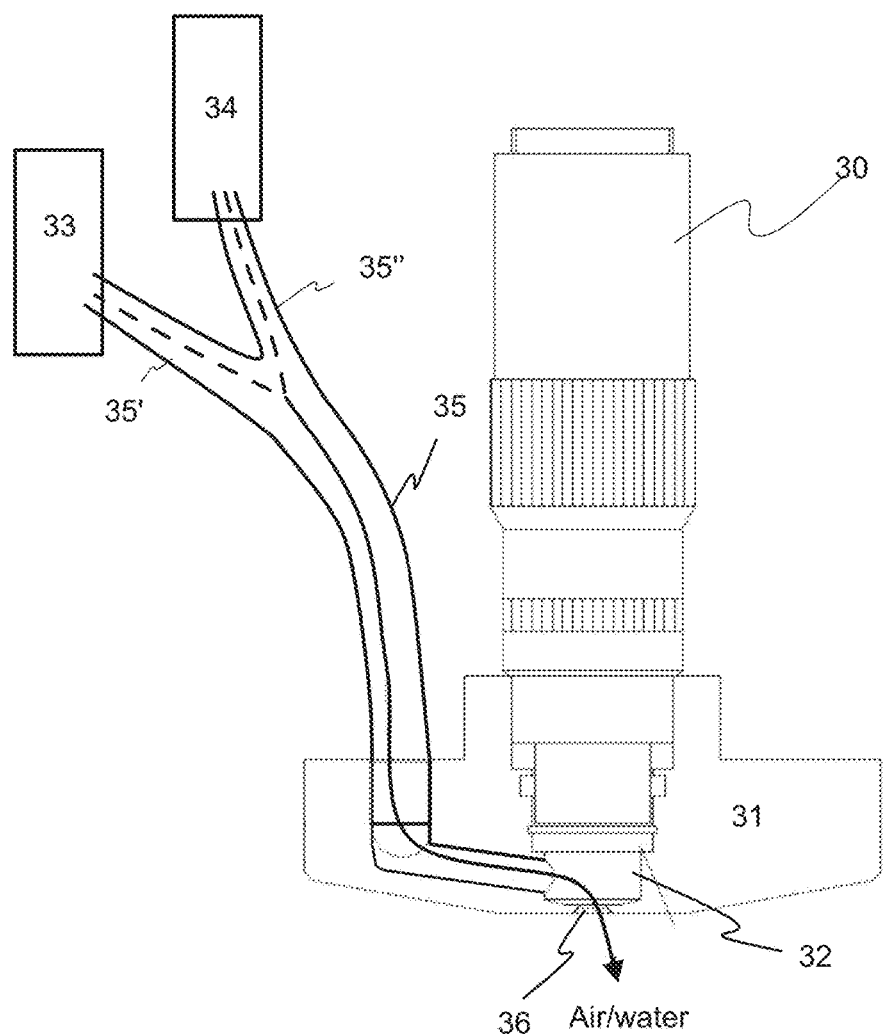
FIG. 3 shows a cleaning system according to a preferred embodiment of the invention, in connection with a pinhole camera comprising a cleaning chamber.

Competition requires that paper and paperboard machines are run at higher and higher speeds, with minimized shut-down time, and to provide high-quality products meeting strict quality specifications. An improvement in productivity is an aim for both the production and the maintenance, and achieving it is contributed by various systems for cleaning web monitoring systems and cameras. For example, the web monitoring beam may comprise an integrated pneumatic nozzle which blows compressed air into the beam via the first end of the beam, and the air is conveyed out via the second end of the beam. The aim is to remove any dust/impurities etc. caught in the beam, by means of the compressed air via the end of the beam. In this method, the whole beam is compressed. However, the beam may be so long that the required pressure and/or quantity of air becomes relatively high, to guarantee a sufficient pressure for removing dust and/or impurities from the inside of the beam.

The pinhole cameras (also called camera obscura) according to the invention, which are used as such or in a web monitoring beam, comprise an integrated cleaning chamber. The cleaning chamber is formed between the pinhole wall of the pinhole camera, and a cover glass, i.e. a so-called auxiliary lens formed between the frontmost lens and the pinhole wall of the pinhole camera, by means of, for example, a flange or the like. The pinhole wall is the part of the flange which is aligned with the lens, opposite to the lens. The cleaning chamber formed between the cover glass and the pinhole wall may be cylindrical. The lower edge of the flange, i.e. the first end of the cylindrical cleaning chamber, is fixed to the cover glass in an air and liquid proof manner, and the upper edge of the flange, i.e. the second end of the cylindrical cleaning chamber, is tightly fastened to the pinhole wall. The cylindrical cleaning chamber is substantially perpendicular to the cover glass and the pinhole wall. The flange used for forming the cylindrical cleaning chamber may be made of, for example, metal, plastic, Teflon, or a composite. The cover glass may be made of, for example, transparent glass or plastic. It may also be coated with a soil and/or moisture repellent coating. The flange, and simultaneously the wall of the cleaning chamber, is equipped with an inlet for supplying air and washing liquid into the cleaning chamber. Both the air and the washing liquid are supplied via the inlet directly to the cleaning chamber, and only to the cleaning chamber, by means of a tube or the like, without cooling the frame of the camera. Thus, air or washing liquid is not used for cooling the frame of the camera, for example by conveying compressed air to a housing provided around the structures of the camera. The tube is fastened to the flange delimiting the cleaning chamber, at the inlet, either directly or by means of an adapter. The cover glass provided between the frontmost lens and the pinhole wall of the camera prevents washing liquid supplied into the cleaning chamber, air, and also impurities and/or liquid entered via the pinhole, from penetrating into the frontmost lens itself, the lens structures, and the interior of the camera. The only way for air and washing liquid out of the cleaning chamber is the pinhole of the camera. In other words, the cleaning chamber between the pinhole wall and the cover glass is a liquid and air proof structure, into which air and washing liquid are only supplied via the inlet provided in the flange, and they exit via the pinhole only.

Air and washing liquid are supplied to the cleaning chamber non-simultaneously, that is, at different times, that is, in an alternating manner. Their supply periods may have different lengths. Washing liquid may be supplied automatically at given intervals, for a given time, or washing liquid may be supplied when needed. When washing liquid is not supplied to the cleaning chamber, compressed air may be supplied to it. Normally, the supply time for washing liquid is shorter than that for air, because no images can be taken with the camera when washing liquid is supplied. Dust, splashes, chemicals, and/or other materials possibly entered in the cleaning chamber and interfering the quality of the images to be taken with the camera, are entrained in both the air and the washing liquid when exiting the cleaning chamber via the pinhole of the camera. The washing liquid may, however, not only convey loose impurities but also flush the surfaces, that is, clean the structures by also removing stains from the surfaces of the cleaning chamber, such as oil stains and impurities entered with compressed air into the cleaning chamber.

Thus, when one or normally several cameras with a cleaning chamber according to the invention are used in a web monitoring beam, compressed air and washing liquid is not supplied to the whole beam but to the cleaning chamber of each camera only. This is because, in the web monitoring beam according to the invention, compressed air is not used for cooling the cameras, but the cameras are cooled separately by blowing motor cooling air from the first end of the camera, for example by a tube from the motor cooling channels of the paper machine or machines, or by blowing some other air at low pressure into the beam. The second end may or may not be equipped with a discharge tube for the cooling air. Thanks to the separate cooling, the pressure of the compressed air used for cleaning the cleaning chamber may be very low, for example lower than 1000 Pa, for example 250 to 500 Pa. If compressed air were supplied to the whole beam, the pressure requirement for the compressed air needed might be as high as 5 to 6 kPa. It should also be taken into account that even if compressed air were not supplied to the whole beam but to housings provided around the cameras, instead of the cleaning chambers according to the invention, the need for pressure of the compressed air is still higher than in a web monitoring beam comprising cameras with cleaning chambers according to the invention. Thus, less compressed air is needed because washing liquid is used in addition to the air. The reduced use of compressed air reduces the running costs of the system used for web monitoring, because compressed air is not economical.

The term "web monitoring beam" refers to any beam or beam structure that can be used for web monitoring; in other words, the beam may be placed in the vicinity of a web in the cross direction of the web to carry at least one functional means used for web monitoring, for example a camera, for example below, on top or by the side of the web. The length, the shape, or the material of the beam is not limited in any way, but it may be, for example, a beam structure made of a carbon fibre material, consisting of several modules, or it may be a uniform beam made of carbon fibre or metal. Moreover, the location of the web monitoring beam in the paper or paperboard machine or in another machine suitable for using the invention, is not limited. However, the cameras comprising a cleaning chamber according to the invention give possibly the greatest advantage when the cameras are placed in a location where the soiling degree and/or rate of the cameras is high, for example in the vicinity of the headbox of the paper or paperboard machine, above the top wire or below the paper or paperboard web. Nevertheless, it should be taken into account that when cameras with cleaning chambers according to the invention are used in the beam without separate housings used for cooling as well, the beam structure may be smaller, at least in some dimensions, because the cameras are smaller without the housings. This gives the advantage of facilitating the placement of the beam in the paper or paperboard machine, because the beam does not require so much space. Paper or paperboard machines may have limited space available for a web monitoring beam, whereby a larger beam with cameras enclosed in housings does not necessary fit in the desired place.

Consequently, the invention is not limited to single cameras according to the invention, comprising a cleaning chamber and being placeable in a web monitoring beam, but the invention also relates to a cleaning system fitted with the cameras, as well as a web monitoring beam comprising cameras according to the invention and a cleaning system. In many cases, it is thus preferable to use cameras in a web monitoring beam and not as such, because of the beam, the cameras can be more easily and better placed in the desired locations and suitably spaced from each other; they can also be aligned more easily. When the cameras enclosed in the beam are installed and adjusted to be operational already at the factory, fewer adjustments of the cameras need to be performed at the place of use of the beam, and the installation of the beam becomes faster. The beam according to the invention is ready for use as such when delivered from the factory, as long as the washing liquid, compressed air, and the connections required for the cameras at the end of the beam are connected to the washing liquid container, the compressed air container, and the camera connections, such as mains power and communication connections. The beam also protects the cameras accommodated by it; furthermore, it protects the cables connected to the cameras and running inside the beam. Moreover, cooling air supplied to the beam cools down not only the cameras but also the cables running in the beam. The life cycle of the cameras and cables protected by the beam becomes longer.

Thus, the cameras according to the invention, placed in a web monitoring beam according to the invention, are preferably pinhole cameras. The type or model of the pinhole camera, or the size of the pinhole, is not limited, but these may be selected according to the object to be monitored, the need, or the location, and the cameras may be any pinhole cameras in which it is possible to integrate a cover glass as well as a cylindrical cleaning chamber between the cover glass and the pinhole wall, comprising an inlet for supplying both compressed air and washing liquid non-simultaneously by means of a tube. Washing liquid may be supplied from a washing liquid container. In this context, the term 'washing liquid container' refers to any washing liquid supply point, water supply, or process water line. In this context, the term 'tube' refers to any pipe, hose, or the like for conveying/supplying compressed air and washing liquid to the cleaning chambers of pinhole cameras. The number of cameras used in one beam is not limited, but there may be one or more cameras, and compressed air and washing liquid may be supplied to the cleaning chambers of all the cameras in the beam. The compressed air and the washing liquid are conveyed by the tubes running inside the beam to the vicinity of the cameras in the beam, from which they are supplied via the inlet to the cleaning chambers. For conveying compressed air and washing liquid within the beam, it is possible to use the same tube connected to the cleaning chamber, whereby either washing liquid or air can be supplied non-simultaneously to the upstream end of the tube. The number of cameras needed in the beam may depend on, for example, the length of the beam or the web to be monitored.

The compressed air used for cleaning may be compressed air or another gas mixture suitable for the purpose. The pressure of the compressed air to be supplied may be selected according to the use; in other words, the pressure may be higher in a place where more cameras are used or where heavier impurities need to be cleaned off, such as splashes instead of dust.

FIG. 1 shows a cross-sectional image of a pinhole camera 10 of prior art, with a cleaning chamber 14. By means of a flange 13, a cleaning chamber 14 is formed between the pinhole wall 11 of the pinhole camera 10 and the frontmost lens 12 having the shape of a truncated cone, i.e. a cross-section of a triangle with a truncated tip. Consequently, by means of the flange 13, the cleaning chamber 14 is limited between the pinhole wall 11 comprising the pinhole 14, and the lens 12 so that the lower edge of the flange 13 is limited to the lens 12 and the upper edge to the wall 11. The lens 12, having a cross-section of a triangle with a truncated tip, protrudes into the cleaning chamber 14. The flange 13 limiting the cleaning chamber 14 is provided with an inlet 16 for supplying compressed air. The compressed air is supplied via the inlet 16 to the cleaning chamber 14, from which the compressed air is removed via the pinhole 15, carrying away the impurities accumulated in front of/in the vicinity of the lens of the pinhole camera 10, and elsewhere in the cleaning chamber 14, via the pinhole 15. To put it simply, the compressed air is blown via the inlet 16 in the cleaning chamber 14 and further via the pinhole 15 out of the pinhole camera 10.

FIG. 2 shows a pinhole camera 20 according to an advantageous embodiment of the invention, with a cleaning chamber 25. With respect to the camera of prior art shown in FIG. 1, the shape of the lens 21 of the camera 20 is changed so that its cross-sectional surface is not a truncated triangle but the lens has a rectangular cross-section. The lens 21 with a rectangular cross-section is lower than a lens shaped as a truncated cone, that is, a lens having a cross-section of a triangle with a truncated tip. This makes it possible to construct a larger cleaning chamber 25, whereby it is possible to provide a cover glass 23 in front of the lens 21, on the side of the pinhole wall 22, for protecting the lens 21. The cover glass 23 is fixed in front of the lens 21 so that no washing liquid, air or other gas can enter between the cover glass 23 and the lens 21, or the lens 21 itself. The cleaning chamber 25 is formed between the cover glass 23 and the pinhole wall 22 by means of a flange 26. The cleaning chamber 25 is cylindrical, and its first end is connected in a liquid and air proof manner to the pinhole wall 22 comprising the pinhole 27, and its second end is fastened in a liquid and air proof manner to the cover glass 23. The flange 26 delimiting the cleaning chamber 25 is provided with an inlet 28 for supplying compressed air and washing liquid. The compressed air and washing liquid may be introduced by e.g. a nozzle via the inlet 28 to the cleaning chamber 25, from which they are removed via the pinhole 27, carrying away any impurities accumulated in front of the lens 21 in the cleaning chamber 25 of the pinhole camera 20. In other words, compressed air and washing liquid are supplied to the cleaning chamber 25 via the inlet 28, and removed from the pinhole camera 20 via the pinhole 27. Numeral 29' designates a sealing between the cover glass 23 and the flange 26, and numeral 29" designates an O ring gasket between the flange 26 and the objective of the camera 20. The sealing between the cover glass 23 and the flange 26 may also be an O ring gasket. The function of the sealings is to provide a liquid and air proof sealing between the different parts. The sealings 29', 29" may be made of, for example, nitrile rubber.

FIG. 3 shows a cleaning system for a pinhole camera 30 according to an advantageous embodiment of the invention. The cleaning system for a pinhole camera comprises a camera 30 with a cleaning chamber 32, a compressed air container 33, a washing liquid container 34, and a tube 35, via which compressed air and washing liquid can be supplied to the cleaning chamber 32. The second end of the tube 35 is connected to the flange 31 surrounding the cleaning chamber 32 of the pinhole camera 30. The first end of the tube 35 is branched, and the first branch 35' is connected to the compressed air container 33 and the second branch 35" to the washing liquid container 34. Either washing liquid from the washing liquid container 34 or compressed air from the compressed air container 33 is supplied non-simultaneously via the tube 35 to the cleaning chamber 32. From the cleaning chamber 32, the compressed air and the washing liquid are removed via the pinhole 36 of the camera 30.

Figure 4:
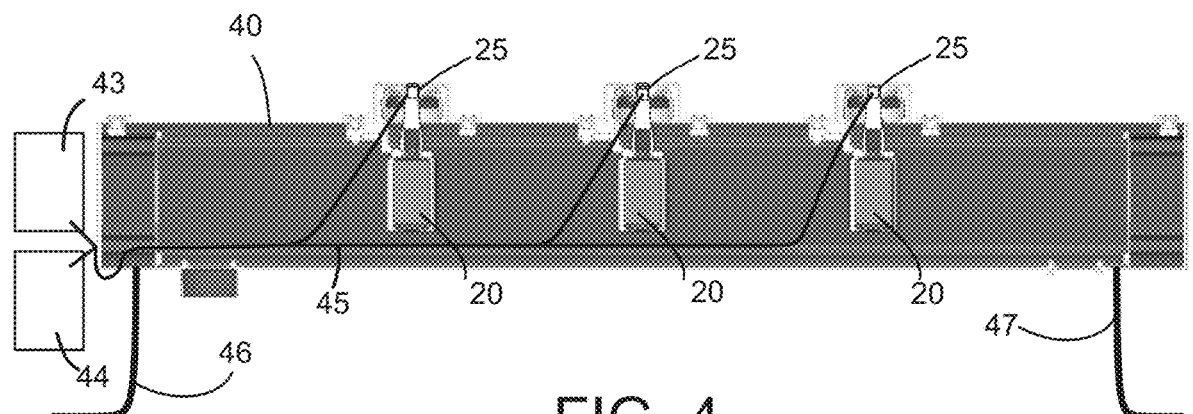
FIG. 4 shows a web monitoring beam according to an embodiment of the invention, comprising cameras and a cleaning system according to the invention.

FIG. 4 shows a web monitoring beam 40 according to an embodiment of the invention, equipped with pinhole cameras and a system for cleaning the pinhole cameras. The web monitoring beam 40 comprises three pinhole cameras 20 comprising a cleaning chamber 25 according to the invention, as well as a compressed air container 43, a washing liquid container 44, and a tube 45. Compressed air is supplied from the compressed air container 43 and washing liquid from the washing liquid container 44 non-simultaneously via the tube 45 to the cleaning chambers 25. The single tube 45 is branched so that the single tube can be used for supplying both compressed air and washing liquid to the cleaning chambers 25 of the cameras 20 via the inlets in the cylinders (not shown). However, it is possible that instead of the single tube, compressed air and washing liquid are supplied to the cleaning chambers 25 of each camera 20 non-simultaneously by separate tubes from the compressed air container 43 and the washing liquid container 44, whereby the cylinder may comprise two inlets, one for each tube. For cooling, cooling air may be supplied to the beam 40 by for example a tube 46 from the area of the first end of the beam 40, from below the beam 40, or right from the first end. The cooling air will then exit the beam 40 from the opposite end of the beam 40, i.e. the second end of the beam 40, for example via a tube 47. The cooling air is low-pressure air and may be obtained, for example, from the motor cooling channel system of the paper machine, or it may be fresh air conveyed from outdoors, or air conveyed from a basement. Optionally, a separate low-pressure air tank may be provided for cooling.

The motor cooling air tube 46 and the tube 45 for supplying compressed air from the compressed air container 45 and washing liquid from the washing liquid container 44 may be connected to the beam, for example both below the beam and/or to its end, by a tube fitting.

The camera according to the invention also facilitates the maintenance. In the past, when the cleaning chamber became soiled, the whole camera had to be removed in order to replace the cleaning chamber, whereas now only the flange, the cover glass and the sealing between them have to be removed and replaced. Thus, there is no need to re-set the cameras, which was the case in cameras of prior art where the chamber area was delimited by the lens. The flange, the cover glass and the sealing between them may be fastened to the camera by means of e.g. a clamping ring or any other suitable fastening mechanism.

The present invention is not limited solely to the above-presented examples but it may be modified within the scope of the appended claims.

The invention claimed is:

1. A pinhole camera comprising:
  a lens having a rectangular longitudinal cross-section;
  a cover glass fixed proximate to front of the lens in an air and liquid tight manner;
  a cylindrical cleaning chamber formed between the cover glass and a wall of the pinhole camera comprising a pinhole, by means of a flange, the flange being provided with an inlet;

wherein the pinhole camera further comprises a tube whose first end is connected to the inlet and whose second end is divided into a first and a second branch for supplying compressed air via the first branch through the inlet to the cleaning chamber, and for supplying washing liquid via the second branch through the inlet to the cleaning chamber, from which cleaning chamber the compressed air and the washing liquid are configured to exit via the pinhole of the pinhole camera.

2. The pinhole camera according to claim 1, wherein the cylindrical cleaning chamber formed between the cover glass and the wall comprising the pinhole of the pinhole camera comprises a first end and a second end and the first end of the cleaning chamber is fastened to the cover glass and the second end of the cleaning chamber is connected to the wall comprising the pinhole in an air and liquid proof manner.

3. The pinhole camera according to claim 1, wherein the pinhole camera is suitable for use in a web monitoring beam.

4. A web monitoring beam comprising:
several pinhole cameras according to the claim 1;
a compressed air container; and
a washing liquid container;
wherein the first branch of the second end of the tube is connected to the compressed air container and the second branch is connected to the washing liquid container, for supplying air from the compressed air container and washing liquid from the washing liquid container in an alternating manner to the cleaning chambers of the pinhole cameras.

5. The web monitoring beam according to claim 4, wherein the pinhole cameras are configured to be cooled by supplying low-pressure cooling air from end of the web monitoring beam into the web monitoring beam.

6. The web monitoring beam according to claim 5, wherein the cooling air supplied to the beam is motor cooling air of a paper machine.

7. The web monitoring beam according to claim 5, wherein the cooling air supplied to the beam is fresh air.

8. A cleaning system for a pinhole camera, comprising:
a compressed air container;
a washing liquid container; and
at least one pinhole camera according to claim 1, wherein the first branch of the second end of the tube is connected to a compressed air container and the second branch is connected to a washing liquid container so that compressed air and washing liquid can be supplied in an alternating manner via the tubes to the cleaning chamber of at least one pinhole camera.

* * * * *